US006494363B1

(12) United States Patent
Roger et al.

(10) Patent No.: US 6,494,363 B1
(45) Date of Patent: Dec. 17, 2002

(54) SELF-SERVICE TERMINAL

(75) Inventors: Ian M. Roger, Dundee (GB); Iain R. F. Sime, Dundee (GB); Stephen W. Swaine, Angus (GB); Michael S. Miller, Dunwoody, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/482,667

(22) Filed: Jan. 13, 2000

(51) Int. Cl.[7] ................................................ G06F 17/60
(52) U.S. Cl. ........................ 235/379; 235/380; 235/382
(58) Field of Search ................................. 235/379, 380, 235/382

(56) References Cited

U.S. PATENT DOCUMENTS

| | | | | | |
|---|---|---|---|---|---|
| 4,420,751 | A | * | 12/1983 | Paganini et al. | 235/379 |
| 5,386,103 | A | * | 1/1995 | DeBan et al. | 235/379 |
| 5,469,506 | A | * | 11/1995 | Berson et al. | 235/379 X |
| 5,519,669 | A | * | 5/1996 | Ross et al. | 340/541 |
| 5,572,596 | A | * | 11/1996 | Wildes et al. | 382/117 |
| 5,616,901 | A | * | 4/1997 | Crandall | 235/379 |
| 5,956,122 | A | * | 9/1999 | Doster | 351/210 |
| 6,011,754 | A | * | 1/2000 | Burgess et al. | 367/116 |
| 6,050,369 | A | * | 4/2000 | Leone et al. | 187/392 |
| 6,061,666 | A | * | 5/2000 | Do et al. | 235/379 |
| 6,064,429 | A | * | 5/2000 | Belk et al. | 348/128 |
| 6,072,894 | A | * | 6/2000 | Payne | 235/375 X |
| 6,083,270 | A | * | 7/2000 | Scott | 703/24 |
| 6,119,096 | A | * | 9/2000 | Mann et al. | 235/384 X |
| 6,138,907 | A | * | 10/2000 | Mori et al. | 235/379 |
| 6,167,297 | A | * | 12/2000 | Benaron | 600/431 |
| 6,199,754 | B1 | * | 3/2001 | Epstein | 235/379 |
| 6,225,902 | B1 | * | 5/2001 | Gahan | 194/200 |
| 6,296,079 | B1 | * | 10/2001 | McNaughton | 109/45 |
| 6,315,197 | B1 | * | 11/2001 | Beardsley | 235/381 |
| 6,332,571 | B1 | * | 12/2001 | Arima et al. | 235/379 |

* cited by examiner

*Primary Examiner*—Thien M. Le
*Assistant Examiner*—Daniel Walsh
(74) *Attorney, Agent, or Firm*—Peter H. Priest

(57) ABSTRACT

A self-service terminal having an acoustic interface is described. The terminal comprises a user locating mechanism, a controller, and an array of individually controllable acoustic elements. In use, the locating mechanism is operable to locate a user and to convey user location information to the controller, and the controller is operable to focus each acoustic element to the user's location to increase the privacy of the user in using the terminal. A method of interacting with a self-service terminal is also described.

15 Claims, 4 Drawing Sheets

FIG. 1
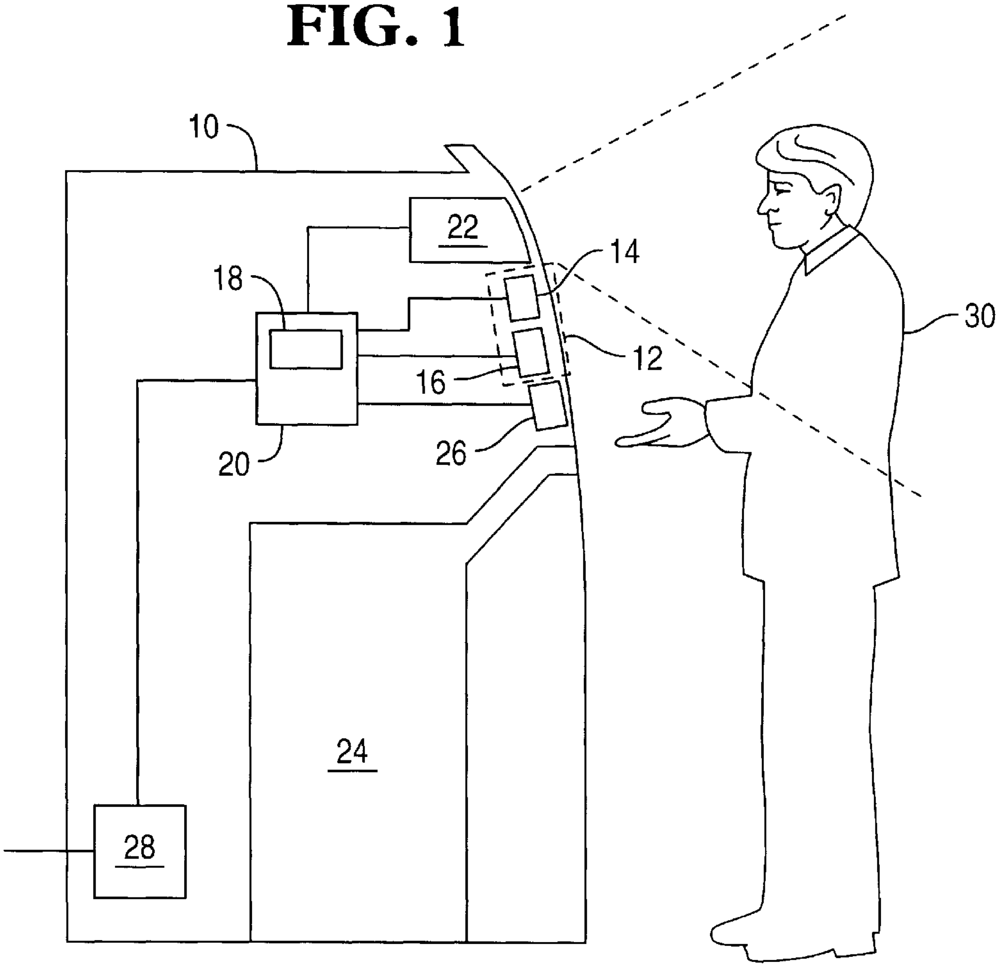
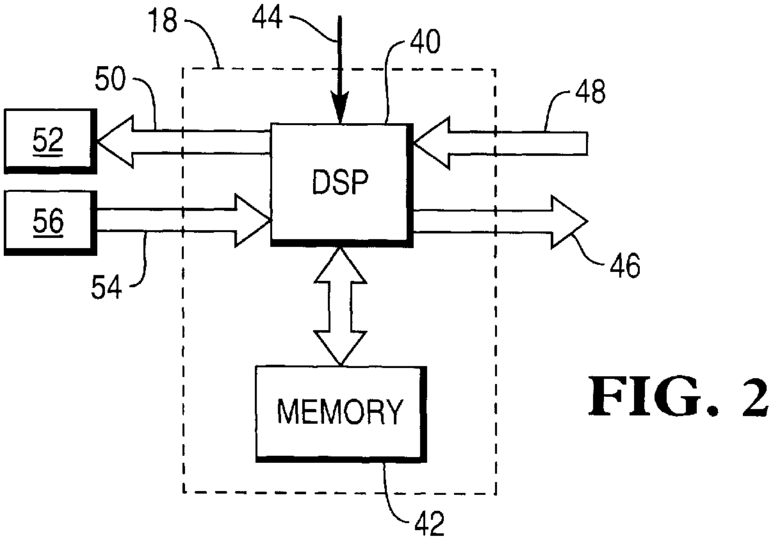
FIG. 2

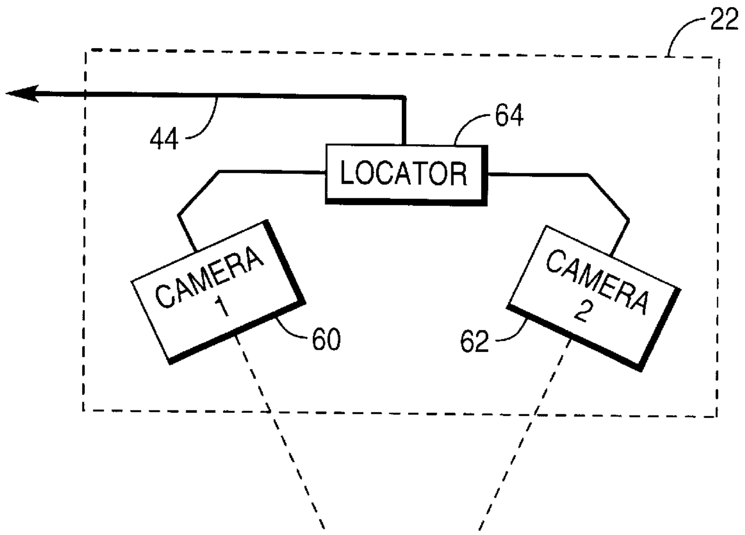
FIG. 3
FIG. 4
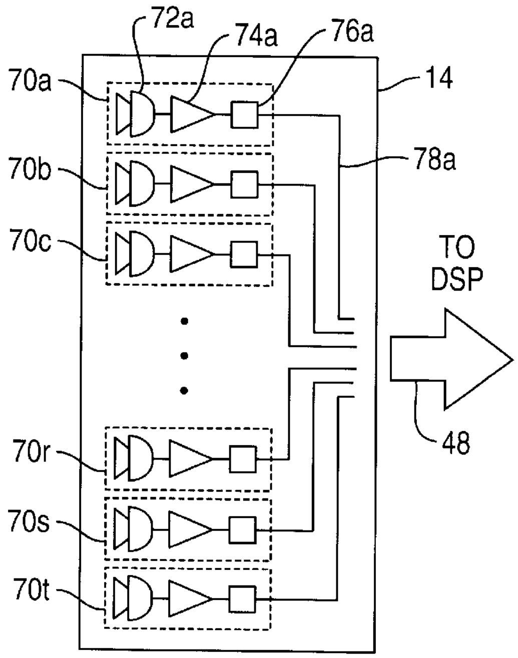
FIG. 5
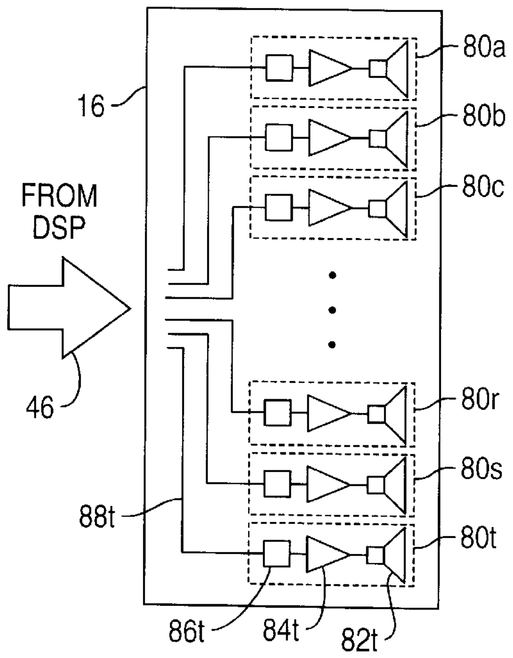

SELF-SERVICE TERMINAL

BACKGROUND OF THE INVENTION

The present invention relates to a self-service terminal (SST). In particular, the invention relates to an SST having an acoustic interface for receiving and/or transmitting acoustic information, such as a voice-controlled ATM.

Voice-controlled ATMs allow a user to conduct a transaction by speaking and listening to an ATM; thereby obviating the need for a conventional monitor. In some voice-controlled ATMs a biometrics identifier, such as a human iris recognition unit, is used to avoid the user having to insert a card into the ATM. When a biometrics identification unit is used, there is no requirement for a conventional keypad.

Voice-controlled ATMs make the human to machine interaction at an ATM more like a human to human interaction, thereby improving usability of the ATM. Voice-controlled ATMs also improve access to ATMs for people having certain disabilities, such as visually-impaired people.

Although voice-controlled ATMs have a number of advantages compared with conventional ATMs, they also have some disadvantages. These disadvantages mainly relate to privacy and usability.

Some disadvantages relate to the ATM speaking to the user. For example, if an ATM that is located in a public area audibly confirms withdrawal of one hundred pounds, then the user may feel vulnerable to attack and may believe that there is a lack of privacy for the transaction, as passers-by may overhear the ATM confirming the large amount of cash to be withdrawn.

Other disadvantages relate to the user speaking to the ATM. For example, in noisy environments such as a busy street or a shopping center, the ATM may not be able to discriminate between the user's voice and background noise. The user may become frustrated by the ATMs failure to understand a command being spoken by the user; this may lead to the user shouting at the ATM, which further reduces the privacy of the transaction.

SUMMARY OF THE INVENTION

It is an object of an embodiment of the present invention to obviate or mitigate one or more of the above disadvantages or other disadvantages associated with SSTs having acoustic interfaces.

According to a first aspect of the present invention there is provided a self-service terminal having an acoustic interface characterized in that the terminal comprises a user locating mechanism, a controller, and an array of individually controllable acoustic elements; whereby, in use, the locating mechanism is operable to locate a user and to convey user location information to the controller, and the controller is operable to focus each acoustic element to the user's location.

It will be appreciated that the acoustic elements may be microphone or loudspeaker elements. When the acoustic elements are loudspeakers, the controller is operable to control the loudspeakers so that sound from the loudspeakers is only audible in the area in the immediate vicinity of the user. This ensures that the privacy of the user is increased. When the acoustic elements are microphones, the controller is operable to control the microphones so that only sound from the area in the immediate vicinity of the user is conveyed, thereby removing the effect of background noise. The microphone elements may detect all sound indiscriminately and the controller may operate on all the sound to mask out sound from areas other than the vicinity of the user. Alternatively, the microphone elements may only detect the sound from the vicinity of the user.

The term "focus" as used herein denotes directing the acoustic elements to a relatively small area or zone. Where the elements are microphones, when the microphones are focused audible signals are only conveyed from this zone, even if the microphones detect sound from areas outside this zone. Where the elements are loudspeakers, when the loudspeakers are focused they transmit audible signals to only this zone.

The zone may be defined by a certain angular beam width, for example, if a linear array is used and the array can focus anywhere between the angles of −45 degrees and +45 degrees relative to a line normal to the array, then the elements may be able to focus to a zone of five degrees, such as −20 to −15 degrees. The zone may be defined by an angular beam width and a distance, for example two meters from the array and at an angular beam width of −15 to −20 degrees.

Preferably, the locating mechanism uses visual detection to locate the user and to output user location information to the controller in real time. For example, the visual detection may be a stereo imager. One advantage of using a visual detection mechanism is that the user will be located accurately even though the background noise is louder than the user's voice; whereas, if an audio detection mechanism is used then the background noise may be targeted because it is the loudest noise being detected.

Another advantage of using a visual detection system is that the acoustic elements can be focused on the user prior to the user speaking to the SST, this ensures that all of the user's speech will be detected by the SST; whereas, if an audio detection mechanism is used, the user cannot be targeted until he/she speaks to the SST, so the first few words spoken by a user may not be detected very clearly.

Yet another advantage of using a visual detection system is that the visual system can continue detecting the user's position during a transaction, so that if the user moves then the acoustic elements can be re-focused to the user's new position.

In one embodiment where an SST includes an iris recognition unit, the stereo cameras that are used to locate the user's head may be modified to output a value indicative of the position of the user's head. This value may relate to the angular position of the user's head relative to a line normal to the array of elements. Some additional processing may be performed to locate the user's mouth and ears, as iris recognition units generally detect the location of a user's eye.

In less preferred embodiments, the locating mechanism may use an audio mechanism, such as acoustic talker direction finding (ATDF), for locating the position of a user.

Preferably, the array is a linear array. In more complex embodiments, the array may be a planar array for focusing a beam in two dimensions rather than one dimension.

In one embodiment the array may be an array of ultrasonic emitters or transducers that are powered by an ultrasonic amplifier, under control of an ultrasonic signal processor, to produce a narrow beam of sound.

The controller may control an array of microphones and an array of loudspeakers. The two arrays may be integrated into the same unit.

Preferably, the controller controls the array using a spatial filter to operate on the acoustic elements in the array. One suitable type of filter is based on the electronic beamforming technique, and is called "Filter and Sum Beamforming". By using beamforming, the amplitude of a coherent wavefront can be enhanced relative to background noise and directional interference, thereby achieving a narrower response in a desired direction. In one implementation of a spatial filter, the controller includes a digital signal processor (DSP) and an associated memory, where the DSP applies a Finite Impulse Response filter to each element.

Alternatively, but less preferred, the controller may control the elements by adjusting the physical orientation of the elements.

Preferably, the memory is pre-programmed with a plurality of algorithms, one algorithm for each zone at which the elements can be focused. The algorithms comprise coefficients (which may include weighting and delaying values) for applying to each element.

Preferably, the DSP receives the user location information, accesses the memory to select an algorithm corresponding to the user location information, and applies the coefficients within the algorithm to the acoustic elements to focus the elements at the desired zone.

Preferably, each microphone element includes a transducer, a pre-amplifier, and an analog-to-digital (A/D) converter. Preferably, each loudspeaker element includes a power amplifier, a transducer, and a digital-to-analog converter (D/A).

By virtue of this aspect of the invention, the acoustic elements can be used to create a privacy zone around the user's head so that only the user can hear an SST's spoken commands, and the SST only listens to the user's spoken commands; thereby improving privacy and usability for the user, and the speech recognition of the terminal.

According to a second aspect of the present invention there is provided a self-service terminal having an acoustic interface characterized in that the terminal comprises a lo directional acoustic element array capable of interacting with a user located anywhere in a broad zone, a steering mechanism operable to direct the array to a narrow zone within the broad zone, and a locating mechanism operable to detect the location of a user within the broad zone and to inform the steering mechanism of the location of the user.

The broad zone may be at least five times the size of the narrow zone; preferably, the broad zone is at least ten times the size of the narrow zone; advantageously, the broad zone is at least sixteen times the size of the narrow zone. In one embodiment, the narrow zone is defined by an angular beam width of 5 degrees and the broad zone is defined by a beam angle of 90 degrees.

According to a third aspect of the invention there is provided a method of interacting with a user of an SST, characterized by the steps of detecting the location of the user and adjusting one or more acoustic element arrays to focus the arrays at the location of the user.

According to a fourth aspect of the invention there is provided a self-service terminal having an acoustic interface characterized in that the terminal comprises a user locating mechanism, a controller, and an array of individually controllable loudspeaker elements; whereby, in use, the locating mechanism is operable to locate a user and to convey user location information to the controller, and the controller is operable to direct first audio signals to the location of the user and second audio signals to other locations.

The first audio signals may relate to a transaction being conducted by the user. The second audio signals may be audio advertisements to passers-by or people waiting in a queue to use the SST. Alternatively, the second audio signals may be noise (such as white or pink noise) or warnings to increase the privacy of the user. Additional audio signals may also be used, so that the terminal may simultaneously transmit different audio signals to a user, to passers-by, to people queuing behind the user, and to people standing too close to the user.

The SST may include a proximity detector for detecting the presence or entrance of people within a zone around the user. On detecting a person within the zone around a user, the terminal may direct an audio signal to the person in the zone around the user.

By virtue of this aspect of the invention, a steerable loudspeaker array may be used to supply different audio information to a user of an SST than to those people who are in the vicinity of the SST, thereby creating an acoustic privacy shield for the user of the SST.

BRIEF DESCRIPTION OF THE DRAWINGS

These and other aspects of the invention will be apparent from the following specific description, given by way of example, with reference to the accompanying drawings, in which:

FIG. 1 is a schematic diagram of a user interacting with an SST according to one embodiment of the present invention;

FIG. 2 is a block diagram of the array controller of FIG. 1;

FIG. 3 is a simplified block diagram of the locating mechanism of FIG. 1;

FIG. 4 is a block diagram of the microphone array of FIG. 1;

FIG. 5 is a block diagram of the loudspeaker array of FIG. 1;

DETAILED DESCRIPTION

Figure 6A:
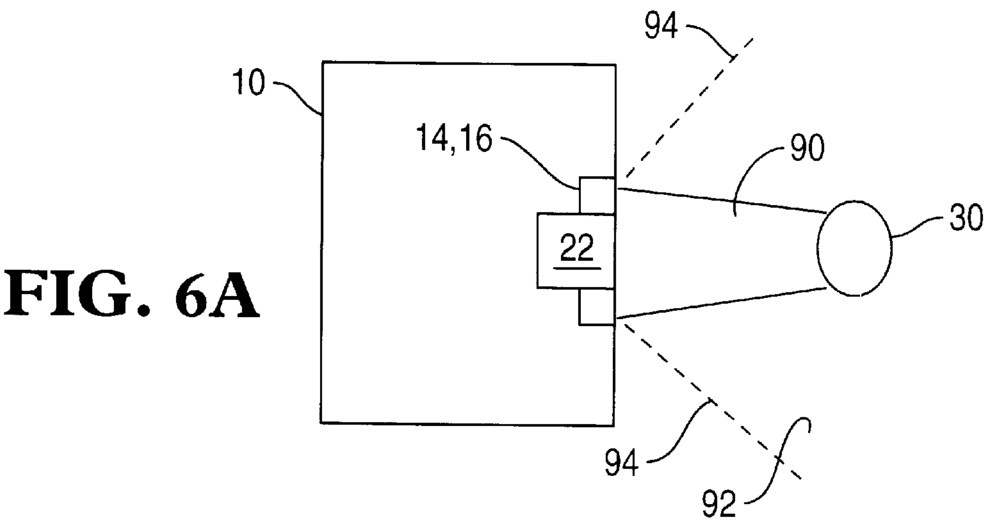
FIGS. 6A,B,C are simplified schematic plan views of a user in three different positions at an ATM.

Referring to FIG. 1, there is shown an SST 10 in the form of an ATM. The ATM 10 has a acoustic interface 12 comprising two linear arrays 14,16 of acoustic elements. One linear array 14 comprises microphone elements, the other linear array 16 comprises loudspeaker elements, as will be described in more detail below.

Both arrays 14,16 are controlled by an array controller 18 incorporated in an ATM controller 20 that controls the operation of the ATM 10.

The ATM 10 also includes a locating mechanism 22 in the form of an iris recognition unit, a cash dispenser unit 24, a receipt printer 26, and a network connection device 28 for connecting to an authorization server (not shown) for authorizing transactions.

The iris recognition unit 22 includes stereo cameras for locating the position of an eye of a user 30. Suitable iris recognition units are available from "SENSAR" of 121 Whittendale Drive, Moorestown, N.J., USA 08057. Unit 22 has been modified to output the location of the user 30 on a serial port to the array controller 18. It will be appreciated by those of skill in the art that the ATM controller 20 is operable to compare an iris template received from the iris unit 22 with iris templates of authorized users to identify the user 30.

The array controller 18 is shown in more detail in FIG. 2. Array controller 18 comprises a digital signal processor 40 and an associated memory 42 in the form of DRAM. The memory 42 stores an algorithm for each possible steering angle, so that for any given steering angle there is an algorithm having coefficients that focus the acoustic elements to a zone represented by that steering angle. The algorithms used are based on the Filter and Sum Beamforming technique, which is an extension of the Delay and Sum Beamforming technique. These techniques are known to those of skill in the art, and the general concepts are described in "Array Signal Processing: Concepts and Techniques" by Don H Johnson and Dan E Dugeon, published by PTR (ECS Professional) February 1993, ISBN 0-13-048513-6.

The DSP 40 receives a steering angle from the iris recognition unit 22 (FIG. 1) as an input on a serial bus 44. This steering angle is used to access the corresponding algorithm in memory 42 for focusing the acoustic elements to this angle.

The DSP 40 has an output bus 46 that conveys digital signals to the loudspeaker array 16; and an input bus 48 that receives digital signals from the microphone array 14; as will be described in more detail below.

The DSP 40 also has a bus 50 for conveying digital signals to a speech recognition unit 52 and a bus 54 for receiving digital signals from a text to speech unit 56. For clarity, the speech recognition unit 52 and the text to speech unit 56 are shown as functional blocks; however, they are implemented by one or more software modules resident on the ATM controller 20 (FIG. 1).

Referring now to FIG. 3, the iris recognition unit 22 includes a pair of cameras 60,62 for imaging the user 30, and a locator 64 for locating the position of the user's eye using the images captured by the cameras 60,62. It will be appreciated that the iris recognition unit 22 contains many more components for capturing an image of the user's iris and processing the image to obtain an iris template; however, these components are well known and will not be described herein. The locator 64 performs image processing on the captured images to determine the position of the user 30. This position is output as a steering angle on the serial bus 44 (see also FIG. 2).

Referring to FIG. 4, which is a block diagram of the linear microphone array 14, the array 14 comprises twenty microphone elements 70 (only six of which are shown). Each element 70 comprises a microphone transducer 72, a preamplifier 74, and an analog-to-digital (A/D) converter 76. Each element 70 outputs a digital signal onto a line 78. All twenty lines 78 are conveyed to the DSP 40 by the digital input bus 48 (see also FIG. 2).

Referring to FIG. 5, which is a block diagram of the linear loudspeaker array 16, the array 16 comprises twenty loudspeaker elements 80 (only six of which are shown). Each element 80 comprises a loudspeaker transducer 82, a power amplifier 84, and a digital-to-analog (D/A) converter 86. Each element 80 receives a digital signal on a line 88. All twenty lines 88 are coupled to the DSP 40 by the digital output bus 46 (see also FIG. 2).

Referring to FIG. 6A, a user 30 initiates a transaction by approaching the ATM 10. The ATM 10 senses the presence of the user 30 in a conventional manner using the iris recognition unit 22. The cameras 60,62 capture images of the user 30 and the locator 64 determines the angular position of the user's head relative to the iris recognition unit 22. The locator 64 converts this angular position (the steering angle) to a digital signal and conveys the digital signal to the DSP 40 via serial bus 44.

When the DSP 40 receives this digital representation of the steering angle, the DSP 40 uses this signal to access memory 42 and retrieve the algorithm associated with this angle. The DSP 40 then receives a user command, such as "Please stand still while you are identified", from the text to speech unit 56. The user command is received as a digital signal on bus 54. The DSP 40 then applies the retrieved algorithm to the user command signal, which has the effect of creating twenty different signals, one for each loudspeaker element. Each of these twenty signals is then applied to its respective loudspeaker element 80. The total sound output from the loudspeaker array 16 is such that only a person located within a privacy zone 90 is able to hear the user command; as the privacy zone 90 is directed to the user's head, the user has increased privacy. The full zone 92 is the maximum area over which the loudspeakers can transmit (which occurs when the acoustic elements are not focused) and is shown between the broken lines 94.

When the user speaks to the ATM 10, which may be in response to a user command such as "What transaction would you like to select?", each microphone element 70 receives the sound from the user 30 and any other ambient sound, such as a passing vehicle, a nearby conversation, and such like. The sound from each microphone element 70 is conveyed to the DSP 40 on input bus 48. The DSP 40 applies the retrieved algorithm to the signal from each microphone element 70. In a similar manner to the loudspeaker signals, the algorithm weights and delays each microphone element signal. The DSP 40 then creates a single signal in which the dominant sound is that of a person positioned at the location of the user's head. The single signal is then conveyed to the speech recognition unit 52 via bus 50. This greatly improves the accuracy of the speech recognition unit 52 because much of the background noise (from locations other than that of the privacy zone 90) is filtered out by the DSP 40.

Figure 6B:
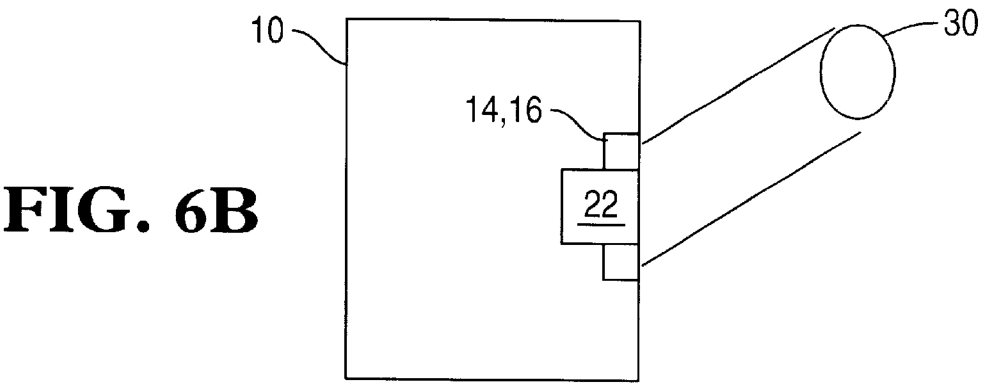
Figure 6C:
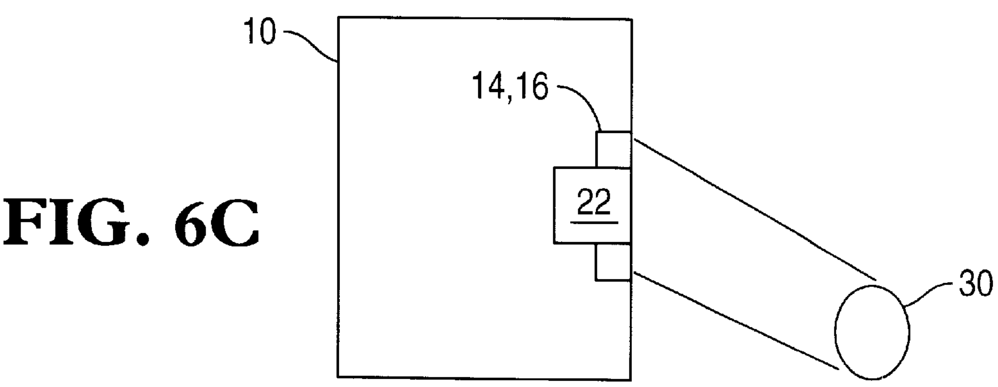

The iris recognition unit 22 continually monitors the position of the user 30, so that if the user 30 moves during a transaction, for example from the position shown in FIG. 6A to the position shown in FIG. 6B, then the locator 64 automatically detects the new location of the user 30 and sends the appropriate steering angle to the DSP 40. The DSP 40 selects the algorithm corresponding to this new steering angle, and the weights and delays associated with this algorithm are used to operate on the acoustic element signals. If the user 30 moves again, for example to the position shown in FIG. 6C, the algorithm is again updated.

Figure 7:
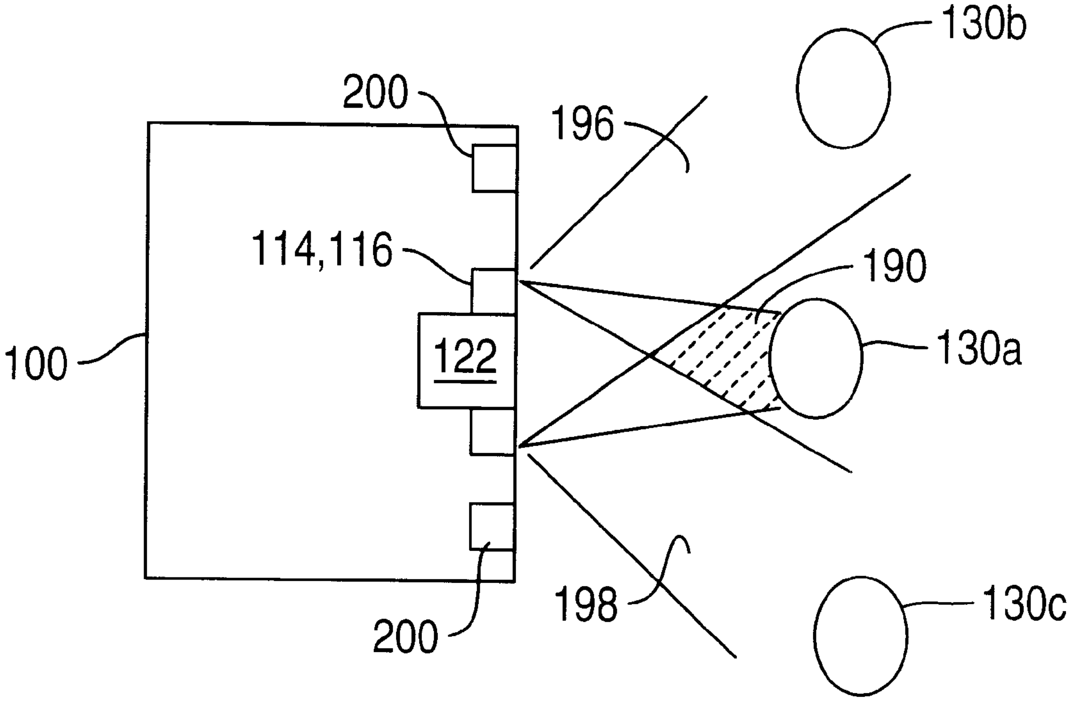
FIG. 7 is a simplified schematic plan view of a user interacting with an ATM according to another embodiment of the present invention.

Referring now to FIG. 7, an ATM 100 includes a microphone linear array 114, a loudspeaker linear array 116, an iris detection unit 122 and two proximity sensors 200. The arrays 114 and 116 are identical to arrays 14 and 16 respectively. In addition, the ATM 100 also has various other ATM modules (none of which is shown in FIG. 7) such as a cash dispenser, a receipt printer, a network connection, and an ATM controller including an array controller.

As shown in FIG. 7, a first person 130a is using the ATM 100, and two other people 130_b,c_ are walking past the ATM 100 in the full zone of transmission of the loudspeaker array 116. The iris recognition unit 122 detects and locates the position of the first person (the ATM user) 130_a_. The proximity detectors 200 detect the presence of the second and third persons 130_b,c_.

The array controller (not shown) simultaneously uses one algorithm for the speech to text signal to be applied to the loudspeaker array 116, another algorithm (having coefficients that focus the loudspeaker transmission in a broader zone to one side of the user 130*a*) for operating on a white noise signal for transmission to a first noise zone 196, and a third algorithm (having coefficients that focus the loudspeaker transmission in a broader zone to the other side of the user 130*a*) for operating on a white noise signal for transmission to a second noise zone 198.

The first and second noise zones correspond to the areas in which the second and third persons 130*b,c* were detected by the proximity detectors 200. Thus, the user 130*a* can hear the speech from the ATM 100 because the user is located within a privacy zone 190, but the second and third persons 130*b,c* only hear noise because they are located in noise zones 196,198.

Instead of transmitting white noise to one or both of the noise zones 196,198, the array controller may transmit audio advertisements to one or both of these zones.

Various modifications may be made to the above described embodiment within the scope of the invention, for example, in other embodiments, the number of loudspeaker elements may be different to the number of microphone elements.

In other embodiments, a different algorithm may be used to steer the acoustic elements, for example, adaptive beamforming using the Griffiths-Jim beamformer. In other embodiments, each array may be an array of ultrasonic emitters or transducers that are powered by an ultrasonic amplifier, under control of an ultrasonic signal processor to produce a narrow beam of sound. In other embodiments the locating mechanism may not be an iris recognition unit, but may be a pair of cameras, or other suitable locating mechanism. In embodiments where the position of the user is constrained, for example in drive-up applications where the user aligns the window of his/her vehicle with the microphone and/or loudspeaker array of the drive-up unit, a single camera may be used.

What is claimed is:

1. A self-service terminal comprising:

a plurality of directional acoustic elements capable of interacting with a user located anywhere in a first zone of coverage;

a controller comprising a digital signal processor and a memory component with a program operable to direct the plurality of directional acoustic elements to a privacy zone of coverage within the first zone substantially surrounding the user's head, wherein only the user within the privacy zone is capable of hearing messages directed to the user transmitted from the plurality of directional acoustic elements and is capable of controlling the self-service terminal operation through the user's own speech; and a locating mechanism operable to detect the location of the user within the first zone of coverage and to inform the controller of the location of the user.

2. A terminal according to claim 1, wherein the locating mechanism uses visual detection to locate the user.

3. A terminal according to claim 1, wherein the locating mechanism uses an audio detection mechanism to locate the user.

4. A terminal according to claim 1, wherein the locating mechanism includes an iris recognition unit.

5. A terminal according to claim 1, wherein the array includes a linear array.

6. A terminal according to claim 1, wherein the controller controls the array using a spatial filter to operate on the acoustic elements of the array.

7. A self-service terminal comprising:

a multi-element directional acoustic array capable of interacting with a user located anywhere in a first zone of coverage;

a steering mechanism comprising a digital signal processor and a memory component operable to direct said array to a privacy zone of coverage within the first zone of coverage; and a locating mechanism operable to detect the location of a user within the first zone of coverage and to inform the steering mechanism of the location of the user, the digital signal processor utilizing an algorithm stored in memory to apply different signals to each element in the multi-element directional acoustic array which results in focusing the elements on the privacy zone.

8. A terminal according to claim 7, wherein the locating mechanism includes an iris recognition unit.

9. A method of interacting with a user of a self-service terminal, the method comprising the steps of:

detecting the location of the user within the first zone of coverage;

adjusting one or more acoustic elements to focus the acoustic elements at a privacy zone of coverage within the first zone substantially surrounding the user's head such that only the user is capable of hearing messages transmitted from the terminal and the terminal only responds to messages spoken from the user.

10. A method of operating a self-service terminal, the method comprising the steps of:

detecting locations of a first and a second user within the first zone of coverage;

adjusting a plurality of acoustic elements to focus the plurality of acoustic elements at a privacy zone of coverage within the first zone said privacy zone substantially surrounding the first user's head such that only the first user is capable of hearing first audio signals transmitted from the terminal intended for the first user and the terminal only responds to messages spoken from the first user; and adjusting a plurality of loudspeaker elements to transmit second audio signals to the second user.

11. A self-service terminal comprising:

an array of individually controllable loudspeaker elements;

a user locating mechanism operable to locate a user; and a controller operable to receive user location information from the locating mechanism and operable to control a plurality of loudspeaker elements to direct first audio signals to the location of the user and second audio signals to other locations.

12. A terminal according to claim 11, wherein the locating mechanism includes an iris recognition unit.

13. A self-service terminal comprising:

a plurality of controllable loudspeakers capable of transmitting messages to a user located anywhere in a first zone of coverage;

a locating mechanism operable to detect the location of the user within the first zone of coverage and to inform a controller of the location of the user;

the controller comprising a digital signal processor and a memory component with a program operable to dynamically focus the plurality of controllable loudspeakers to a privacy zone of coverage having a relatively small area within the first zone and including the user based upon the detected location of the user.

14. A self-service terminal comprising:

a plurality of controllable microphones capable of receiving speech from a user located anywhere in a first zone of coverage;

a locating mechanism operable to detect the location of the user within the first zone of coverage and to inform a controller of the location of the user;

the controller comprising a digital signal processor and a memory component with a program operable to dynamically focus the plurality of controllable microphones to a privacy zone of coverage having a relatively small area within the first zone and including the user based upon the detected location of the user.

15. A self-service terminal comprising:

a plurality of controllable loudspeaker elements;

a plurality of controllable microphones capable of receiving speech from first user located anywhere in a first zone of coverage;

a locating mechanism operable to detect the location of the first user within the first zone of coverage and to inform a controller of the location of the first user;

a proximity detector operable to detect a second user within the first zone of coverage and to inform the controller of the location of the second user;

the controller comprising a digital signal processor and a memory component with a program operable to control a plurality of loudspeaker elements to direct first audio signals to a privacy zone substantially surrounding the head of first user and second audio signals to the location of the second user, the controller operable to control the plurality of controllable microphones to receive speech only from first user in the privacy zone.

* * * * *